US005145749A

United States Patent [19]

Matthew

[11] Patent Number: 5,145,749

[45] Date of Patent: Sep. 8, 1992

[54] COATING COMPOSITION AND COATED PAPER

[75] Inventor: Michael K. Matthew, Canterbury, England

[73] Assignee: James River Graphics Limited, London, England

[21] Appl. No.: 362,507

[22] Filed: Jun. 7, 1989

[30] Foreign Application Priority Data

Jun. 8, 1988 [GB] United Kingdom ................. 8813557

[51] Int. Cl.[5] ......................... C08L 91/06; C08K 3/34; C08K 3/26; B32B 27/10

[52] U.S. Cl. ..................................... 428/511; 428/486; 428/507; 428/916; 524/425; 524/487; 524/488; 524/489; 524/492; 524/493; 524/847

[58] Field of Search ............... 524/487, 489, 425, 492, 524/493, 488, 847; 428/916, 486, 507, 511

[56] References Cited

U.S. PATENT DOCUMENTS

| | | | |
|---|---|---|---|
| 4,092,449 | 5/1978 | Bernstein | 428/916 |
| 4,267,092 | 5/1981 | Glaser et al. | 524/425 |
| 4,517,228 | 5/1985 | Matejka et al. | 427/393 |
| 4,551,499 | 11/1985 | Cranfield et al. | 524/487 |
| 4,636,258 | 1/1987 | Hayashi et al. | 524/487 |
| 4,792,515 | 12/1988 | Muller et al. | 430/168 |
| 4,849,316 | 7/1989 | Kawasaki et al. | 524/487 |

FOREIGN PATENT DOCUMENTS

| | | | |
|---|---|---|---|
| 0011850 | 3/1974 | Japan | 524/487 |
| 0054096 | 3/1983 | Japan | 524/425 |
| 0598921 | 3/1978 | U.S.S.R. | 524/487 |

*Primary Examiner*—Paul R. Michl
*Assistant Examiner*—Peter Szekely

[57] ABSTRACT

Erasable coatings for xerography paper comprise a pigment such as calcium carbonate in a binder such as an aqueous emulsion of an acrylic polymer. The erasability of the coating is improved by replacing at least 15 wt % of the binder with a polyalkane or (preferably) polyalkene wax, such as an aqueous emulsion of a polyolefin.

12 Claims, No Drawings

COATING COMPOSITION AND COATED PAPER

BACKGROUND OF THE INVENTION

1. Field of the Invention

This invention relates to coating compositions and, more particularly but not exclusively, concerns erasable coatings for xerography paper.

2. Description of the Prior Art

Erasure of a part of a xerography image from a paper carrier can be achieved by arranging for the adherence of the image to the carrier to be sufficiently weak that the part of it can be erased from the carrier. Alternatively, such erasure can be achieved if the carrier bears a coating to which the image adheres, and the coating can itself be selectively erased from the carrier substrate below. The present invention provides erasure of this latter type.

Essential requirements of an ideal such erasable coating include:

(i) Ease of erasure i.e. a firm adherence of the coating to the substrate, but which is readily broken by erasing action;

(ii) Firm adherence of the original image to the coating;

(iii) Drafting Receptivity i.e. ready permanent acceptance of ink and pencil impressions on and around the image area which has suffered erasure; and (iv) Image Breakthrough Resistance i.e. the coating must be unbroken and prevent any of the original image reaching the substrate, for any such penetrating image would not be erased by removal of the overlying coating.

It has already been proposed to provide xerography papers carrying an erasable coating. One example is the 100% rag-based vellum sold by Solvent Coating Corporation under the trade mark PERMALITE. The previously proposed coatings are based on a rubbery polymeric binder material in a solvent or aqueous carrier and may contain dyes or pigments and additives to modify the look and feel of the product paper.

The rubbery polymeric compositions are relatively expensive. It is one object of the present invention to achieve satisfactory standards in the essential requirements listed above, more cheaply than the previously proposed compositions.

SUMMARY OF THE INVENTION

This object is achieved by incorporating, in a coating composition of the type identified above, a proportion of waxy material such as a polyolefin dispersion, preferably polyethylene emulsion because it is readily available and is distinctly cheaper than the rubbery polymeric compounds used in the coatings. We have found that by increasing the amount of polyethylene in the composition we achieve a direct and proportional increase in the ease of erasure of the coating, which thereby offers a simple way of controlling the ease of erasure, as required in any particular use of the paper. By incorporating some of the polyethylene emulsion in the coating composition it becomes possible to use rubbery polymeric compounds which would otherwise bind to the substrate too strongly to be suitable for an erasable coating.

DETAILED DESCRIPTION

The description which follows, of Experiments carried out to demonstrate and illustrate the invention, help to clarify the scope of the invention.

EXPERIMENT 1

An erasable coating formulation 1 was made up according to the following composition:

| Component Code | Proportion by weight | Nature of Component | Trade Name of Component |
|---|---|---|---|
| A | 50% | a binder, which is an aqueous emulsion of acrylic polymer | PRIMAL AC33 |
| B | 50% | a pigment, which is calcium carbonate (calcite) powder | DURCAL 5 |

PRIMAL AC33 is available from Rohm & Haas (UK) Ltd of Croydon, England and DURCAL 5 from Croxton & Garry Ltd of Dorking, England.

To samples of this formulation 1 were added, respectively, 4%, 6% and 8% of an aqueous dispersion of polyethylene (trade name MYSTOLUBE-S) to produce formulations 2, 3 and 4 respectively. The dispersion is sold by Catomance Ltd of Welwyn Garden City, England, mainly for use in the textile industry.

The four formulations were each applied to one surface of a translucent drawing office paper, at a rate calculated to yield a dry coatweight of the coating of 7 $gm^{-2}$.

An image, which included areas of solid black, was then copied onto the coated surfaces using a XEROX 2080 plain paper copier.

The erasability of the coating was tested by using a soft rubber eraser to remove a portion of the solid black image. The amount of work needed to remove the image was recorded in Table 1 as follows:

TABLE 1

| Formulation | Amount of Polyethylene | No of Units of Work to Remove Coating |
|---|---|---|
| 1 | 0 | 85 |
| 2 | 4 | 70 |
| 3 | 6 | 60 |
| 4 | 8 | 55 |

The results show a direct and proportional increase in erasability as the amount of wax in the coating composition is increased.

EXPERIMENT 2

A wide range of binder/wax combinations were tested, to see which combinations yielded good results, and which not. Erasability was assessed as explained above but in a scale of 1 to 4, with work of 30 units or less being categorised 1—excellent, 31 to 55 categorised 2—good, 56 to 70 as 3 —fair and 71 and above as 4—poor.

The results are given below in Table 2. Individual constituent materials are identified by abbreviations and these are explained in the Key below:

KEY TO TABLE 2

P=PRIMAL AC 33 (see Experiment) also known as RHOPLEX AC-33, which is a copolymer of ethyl acrylate and methyl methacrylate V34=VINAMUL 3401—a polymethylmethacrylate binder, from Vinamul Ltd., of Carshalton, Surrey, England.

V32=VINAMUL 32623—another polymethylmethacrylate from Vinamul Ltd.

D=DURCAL 5 (see Experiment 1)

G=GASIL 35—a particulate silica matting agent from Crosfield Chemicals of Warrington, England having a particle size of about 4.5 μm.

PG=PARACOL PG—a wax emulsion with cationic emulsifier, from Hercules Ltd., of Reigate, Surrey, England.

M-S=MYSTOLUBE-S (see Experiment 1)

BU=BRADSYN UC40—oxidised polyethylene with cationic emulsifier, from Hickson & Welch Ltd., of Castleford, West Yorkshire, England.

E=EMREL-2—oxidised polyethylene with non-ionic emulsifier, from Hickson & Welch Ltd.

BP=BRADSYN PC12—polyethylene with tallow amide, from Hickson & Welch Ltd.

P-E=POLY-EM40—an oxidised polyethylene emulsion, from Rohm & Haas Co., Croydon, Surrey, England.

M-F=MYSTOLUBE FH—a polyethylene wax of amphoteric nature, from Catomance Ltd.

M-K=MYSTOLUBE KSE—an emulsion of synthetic ester waxes, from Catomance Ltd.

M-C=MYSTOLUBE CW—a cationic paraffin wax emulsion, from Catomance Ltd.

L54=LAKELAND N540/20—an ethylene/acrylate copolymer from Lakeland Laboratories, Manchester, England.

L37=LAKELAND N371/30—another such ethylene/acrylate copolymer.

L39=LAKELAND N393/20—an oxidised polyethylene emulsion from Lakeland Laboratories.

L26=LAKELAND N261/35—an ethylene/acrylic acid copolymer from Lakeland Laboratories.

14, 15 and 17 contained waxes which are esters or acrylates rather than alkanes or alkenes.

It is postulated that, in the dry coating, the wax is present as discrete beads within a continuous matrix of the polymeric carrier.

Production compositions are likely to include small quantities of additional constituents such as dispersants and defoamers.

The invention has primary application to translucent drawing office papers to which xerographic images are to be applied, but is applicable to other papers and images formed by techniques other than by xerography, for example, manual drafting, diazo processes and thermal imaging.

What I claim is:

1. Electrophotographic paper comprising a coating composition adhered to a substrate, said coating composition being erasable by local breakage of adhesion of said coating composition to said substrate, said coating composition comprising a synthetic polymeric elastomeric binder and a wax, said synthetic polymeric elastomeric binder being selected from the group consisting of an aqueous emulsion of an acrylic polymer and polymethylmethacrylate and wherein said wax is selected from the group consisting of polyalkane and polyalkene waxes and is present in an amount of at least 15 wt % of the elastomeric binder, said coating composition being adapted to receive an image at the top free surface thereof and resist penetration through the coating, of substances which define said images.

2. The paper as claimed in claim 1, wherein the wax is a polyolefin wax.

3. The paper as claimed in claim 1, wherein the wax is an aqueous polyolefin emulsion.

4. The paper as claimed in claim 1, wherein the wax is a polyolefin emulsion which is present in the composition in an amount of at least 10 wt % of the composition.

5. The paper as claimed in claim 4, wherein the amount of polyolefin emulsion is about 15 wt % of the composition.

6. The paper as claimed in claim 4, wherein the particulate constituent is present in an amount of from about 46 to about 50 wt % of the composition.

TABLE 2

| SPECIMEN | BINDER | | PIGMENT | | WAX | | |
|---|---|---|---|---|---|---|---|
| NO | Identity | Amount | Identity | Amount | Identity | Amount | ERASABILITY |
| 1 | P | 90 | — | — | PG | 10 | 3 |
| 2 | P | 80 | G | 10 | PG | 10 | 3 |
| 3 | P | 40 | D | 50 | M-S | 10 | 2 |
| 4 | P | 35 | D | 50 | M-S | 15 | 1 |
| 5 | P | 30 | D | 50 | M-S | 20 | 1 |
| 6 | P | 25 | D | 50 | M-S | 25 | 1 |
| 7 | P | 40 | D | 50 | BU | 10 | 3 |
| 8 | P | 40 | D | 50 | E | 10 | 3 |
| 9 | P | 40 | D | 50 | BP | 10 | 2 |
| 10 | P | 35 | D | 50 | P-E | 15 | 1 |
| 11 | P | 35 | D | 50 | M-F | 15 | 2 |
| 12 | P | 35 | D | 50 | M-K | 15 | 3 |
| 13 | P | 35 | D | 50 | M-C | 15 | 1 |
| 14 | P | 35 | D | 50 | L54 | 15 | 3 |
| 15 | P | 35 | D | 50 | L37 | 15 | 3 |
| 16 | P | 35 | D | 50 | L39 | 15 | 2 |
| 17 | P | 35 | D | 50 | L26 | 15 | 3 |
| 18 | V34 | 35 | D | 50 | M-S | 15 | 1 |
| 19 | V32 | 35 | D | 50 | M-S | 15 | 2 |

The specimens with only fair erasability (category 3) are Nos. 1, 2, 7, 8, 12, 14, 15, and 17. Nos. 1, 2, 7 and 8 had low content of wax relative to binder, and Nos. 12, 7. The paper as claimed in claim 1, wherein the coating composition contains a particulate constituent selected from the group consisting of calcium carbonate powder and particulate silica, with a particle size in a range from about 4.5 μm to about 5 μm.

8. The paper as claimed in claim 7, wherein the particulate constituent is present in an amount of 10–50 wt %.

9. The paper as claimed in claim 1, wherein the binder is present in an amount of 25–90 wt %.

10. Electrophotographic paper, which comprises:

a paper support, and a coating adhered to said paper support, said coating being erasable by local breakage of adhesion of said coating to said paper support, said coating comprising about 25–90 wt % of a synthetic polymeric elastomeric binder and a wax, said synthetic polymeric elastomeric binder being selected from the group consisting of an aqueous emulsion of an acrylic polymer and polymethylmethacrylate, and wherein said wax is selected from the group consisting of polyalkane and polyalkene waxes which is present to an extent of at least 15 wt % of the elastomeric binder, said coating composition being adapted to receive an image at the top free surface thereof and resist penetration through the coating, of substances which define said images.

11. The paper as claimed in claim 10, further comprising about 10–50 wt % of a particulate constituent.

12. In xerography paper comprising a support and a coating containing a synthetic polymeric elastomeric binder thereon, said coating being adapted to receive an image at the top free surface thereof and resist penetration through the coating of substances which define said image, the improvement comprising incorporating into said coating a polyalkane or polyalkene wax in an amount at least 15 wt % of said elastomeric binder material, said coating incorporating said wax being adhered to said support, said coating being erasable by local breakage of adhesion of said coating to said support.

* * * * *